United States Patent [19]

Mayfield

[11] Patent Number: 5,303,604
[45] Date of Patent: Apr. 19, 1994

[54] FEED SYSTEM

[76] Inventor: Ralph W. Mayfield, 557 Anna May Dr., Cincinnati, Ohio 45244

[21] Appl. No.: 952,038

[22] Filed: Sep. 28, 1992

[51] Int. Cl.$^5$ .................. F16H 27/02; F16H 55/17
[52] U.S. Cl. ................. 74/89.15; 74/424.8 B; 74/459
[58] Field of Search ........ 74/89.15, 424.8 R, 424.8 B, 74/459

[56] References Cited

U.S. PATENT DOCUMENTS

| | | | |
|---|---|---|---|
| 1,614,038 | 1/1927 | Maxson | 74/424.8 R |
| 2,290,395 | 7/1942 | Van Ness et al. | 74/424.8 B |
| 3,244,022 | 4/1966 | Wysong, Jr. | 74/424.8 |
| 4,715,241 | 12/1987 | Lipinski et al. | 74/89.15 |
| 4,797,086 | 1/1989 | Adachi | 425/589 |
| 5,022,277 | 6/1991 | Shaffer | 74/424.8 |

FOREIGN PATENT DOCUMENTS 629385 9/1978 U.S.S.R. .
571886 9/1945 United Kingdom ........... 74/424.8 B
907278 10/1962 United Kingdom ........... 74/424.8 B

OTHER PUBLICATIONS

Hinkle, Rolland T., *Kinematics of Machines* (2d Edition), Prentice-Hall Inc. 1960, pp. 247, 248; Section 11.10.

*Primary Examiner*—Leslie A. Braun
*Assistant Examiner*—David W. Laub

[57] ABSTRACT

First and second screw threads along a feed screw permit a slide to be fed at two different speeds for a constant rotation of the feed screw. A first nut moves along the first thread. A second nut is threaded onto the outer diameter of the first nut for common translation along the first thread. Upon contacting a stop shoulder, the first nut stops translation and starts rotating with the screw. This rotation causes the second nut (and slide) to translate off the first nut and onto the second screw thread.

7 Claims, 3 Drawing Sheets

FEED SYSTEM

TECHNICAL FIELD

This invention relates to feed systems utilizing a precision screw and mating nut.

In particular, the invention relates feed systems where it is desired to produce two different sets of output conditions in a nut system from a single set of input conditions in a screw system.

BACKGROUND OF THE INVENTION

Since many types of machinery require several rates of travel along an axis during a machine cycle, this is a common machine design problem usually sought to be solved. For example, in metal cutting machine tools, it is frequently necessary to provide a rapid traverse or approach rate, where the tool comes from a clearance or home position, to a point near the workpiece where the tool then drops to a cutting feed rate. In a screw feed system for this application, it would be desirable to employ a screw which has a variable lead to obtain a variable axial feed velocity output resulting from a constant angular velocity input.

Molding machines, such as plastic injection molding machines, often have a continuous stroke cycle where a mold platen is moved along an axis with respect to a fixed platen, during a first stroke portion, in order to close a mold after a part has been extracted; a second stroke portion is used to drive the mold platens tightly against one another to withstand the injection pressures. The second stroke portion would usually involve a higher force than the first stroke portion of movement. In a screw feed system for this application, it would be desirable to employ a screw which produces a variable mechanical advantage with a nut system, based on constant input conditions.

It is well-known to provide two different threads on a common screw shaft in both "compound" and "differential" screw systems. The textbook, Kinematics of Machines, second edition, Prentice-Hall, Inc., defines these systems. A compound screw consists of two screws in series arranged so that the resultant motion produced is the sum of the individual motions. A differential screw consists of two screws in series arranged so that the resultant motion produced is the difference of the individual motions. In other words, with reference to a single thread system, a compound screw might be considered a coarse positioning device and a differential screw might be considered a fine positioning device.

One prior art device utilizes a compound screw to provide rapid positioning of a machine part, then converts to use only one of the two threads, for finer feed. U.S. Pat. No. 4,797,086, T. Adachi, Jan. 10, 1989 teaches an apparatus for closing a mold, where a movable mold platen is driven through part of its travel, by a compound screw. Two spaced nuts are used, with the first one fixed to the machine base and the second one mounted on the movable platen, the platen nut being selectively fixed, or freely rotatable, according to the state of an electric clutch. A feed screw has different threads at each end, of opposite hand helixes. When the electric clutch is energized, fixing the second nut, and a torque is transmitted to the screw through a spline, the screw moves through the first nut, and the second nut and platen move along the screw. Thus, the platen sees the addition of the two screw thread leads. The screw has an integrally-fixed mechanical clutch member between the end threads, and a mating mechanical clutch member is integrally-affixed to the second nut. At the precise time the mechanical clutch elements engage, the electric clutch must be deenergized; the now freewheeling second nut then simply rotates with the screw while the first nut and mating screw thread continue propelling the platen in conventional single thread fashion.

Several difficulties are inherent in the '086 patent. The screw must be mounted to linearly advance while rotating. Lead errors in both screw threads are seen throughout the rapid feed stroke. An energizeable clutch must be provided, with precise energy control at the point where the mechanical clutch engages and disengages, in order to maintain a smooth, continuous motion. These difficulties are obviated by a feed system which uses two different thread portions on a screw where a nut system can smoothly translate from one thread to the other while the screw is rotating.

SUMMARY OF THE INVENTION

It is an object of the invention to provide a feed system employing two different threads on a common screw for driving a nut system at two different sequential sets of output conditions from a single set of input conditions.

The invention is shown embodied in a feed system for relatively moving a machine member with respect to a reference base, comprising:

a feed screw mounted to the reference base;

a first thread portion formed on the feed screw along its longitudinal axis;

a second thread portion formed on the feed screw along its longitudinal axis, the second and first thread portions being of unequal form;

a first nut cooperatively engaged with the first thread portion of the feed screw;

a third thread portion formed on the first nut along its longitudinal axis, the third thread portion being of form substantially equal to the second thread portion;

a second nut cooperatively engageable with the second and third thread portions, the second nut being mounted to the machine member;

first engagement means for preventing relative rotation between the first nut and the feed screw;

second engagement means for preventing relative rotation between the first nut and the second nut; and means for relatively rotating one of the second nut and feed screw with respect to the other to thereby relatively move the second nut in reverse directions along the longitudinal axis of the feed screw, wherein as the second nut is relatively moved in one direction along the feed screw and the first engagement means is engaged, the second engagement means is disengaged, and wherein as the direction of the second nut is reversed and the second engagement means is engaged, the first engagement means is disengaged.

The preferred embodiment includes the use of antifriction elements, e.g., balls, in the first, second, and third thread portions.

BRIEF DESCRIPTION OF THE DRAWINGS

FIG. 8 is a sectional view showing a typical machine structure for utilizing the elements of FIG. 1a.

DESCRIPTION OF THE PREFERRED EMBODIMENT

At the outset, it should be noted that certain attitudinal references such as "left", "right", "horizontal", etc., are made for the convenience of the reader and are not to be construed as limitations on the invention.

Figure 1A:
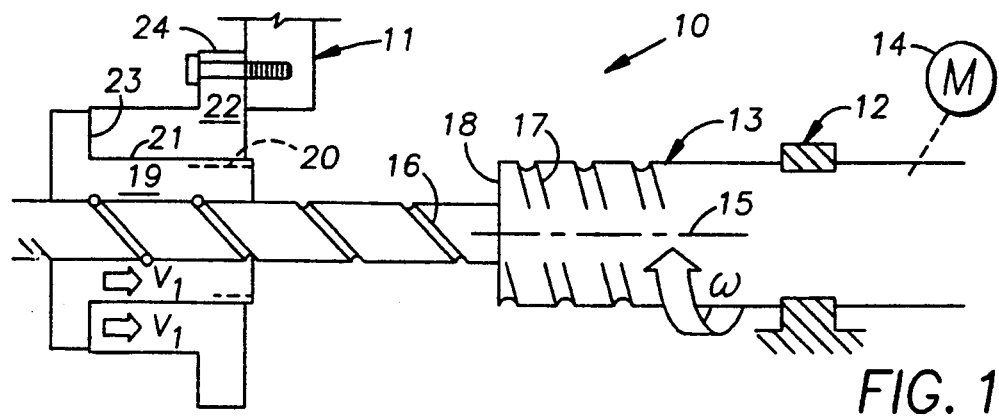
FIGS. 1a–d are sequential drawings of a feed system employing screw thread elements for advancing a nut system along a feed screw.

With reference to FIG. 1a, a feed system 10 is schematically depicted, wherein a machine member, for example, a slide 11, is movably mounted with respect to a machine base 12, the base 12 forming a convenient reference. A feed screw 13 is rotatably journalled and axially fixed with the base 12. Means, for example, the motor 14 shown, is provided for selectively rotating the feed screw 13 about its horizontal longitudinal axis 15 in reverse directions. For ease in following the drawings, only one direction is shown by the broad rotational arrow, indicating a fixed RPM, or constant angular velocity, "$\omega$".

The feed screw 13 has two different threads 16,17, but of the same hand, immediately adjacent to one another along the axis 15, each running from a shoulder 18. The first thread 16 is shown as that having a relatively small pitch diameter with a relatively long-lead helix. The second thread 17 is shown as that having a relatively large pitch diameter with a relatively short-lead helix. Thus, in the preferred embodiment, for a given rotational speed of the feed screw 13, the first thread 16 will provide a faster linear output to a nut than the second thread 17, and the second thread 17 will provide a greater advantage for holding an axial load.

Here it should be noted that the preferred threads, throughout, will be those of a ballscrew, and will include recirculating endless ball circuits. Simplified thread symbols have been used for convenience of the reader so it will readily be appreciated that the nuts may comprise other structures, for example, non-recirculating balls and acme threads.

A first nut 19 is shown cooperatively engaged with the first thread 16. The first nut 19 has a third thread 20 on its body 21, the third thread 20 being substantially equal to the second thread 17, such that a second nut 22 which is threaded onto the first nut 19 may travel onto the second thread 17 at prescribed times. The second nut 22 abuts a flange face 23 of the first nut 19, and a mounting flange 24 of the second nut 22 is bolted to the machine slide 11. The first and second nuts 16,17 are substantially co-extensive, thus resulting in a very compact assembly.

Operation

With the parts assembled per FIG. 1a and rotation of the feed screw 13 at angular velocity (clockwise, when viewed from the right end), the right-hand first thread 16 will cause the first nut 19 to move to the right, at a first velocity, $V_1$. And, since the second nut 22 abuts the flange face 23, the second nut 22 and machine slide 11 are carried along with the first nut 19 at velocity $V_1$.

Figure 1B:
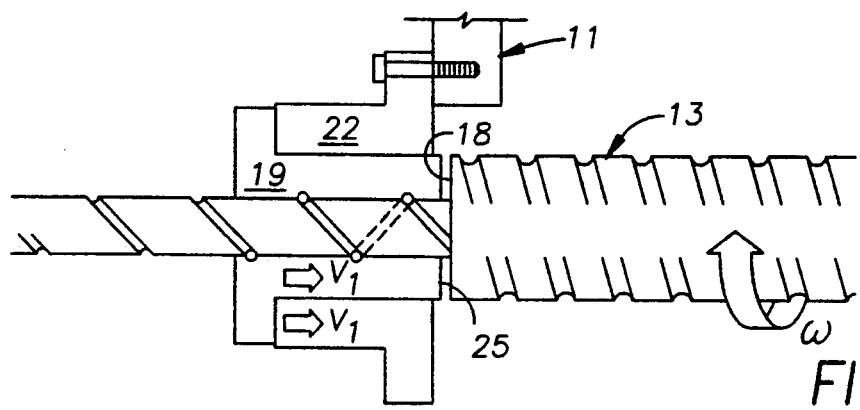

In FIG. 1b, the right end face 25 of the first nut 19 is about to contact the shoulder 18 of the screw 13.

Figure 1C:
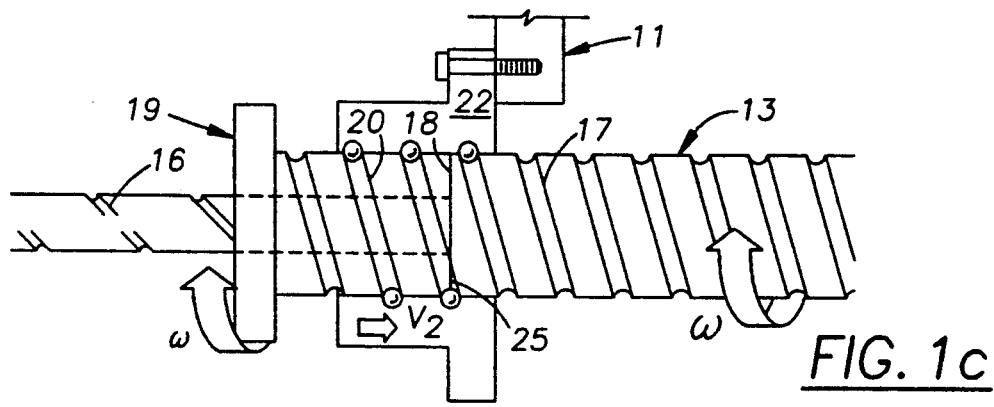

FIG. 1c depicts the elements of FIG. 1a immediately after the end face 25 of the first nut 19 meets the screw shoulder 18. Axial travel of the first nut 19 is halted and the first nut 19 commences rotation in unison with the feed screw 13. The third thread 20 and second thread 17 are phased to form a unitary helix when the first nut 19 contacts the screw shoulder 18. At this stage, the first thread 16 is no longer of any effect. Rotation of the first nut 19 with respect to the second nut 22 now causes the second nut 22 to feed off the third thread 20 and onto the second thread 17 of the feed screw 13 at velocity $V_2$.

Figure 1D:
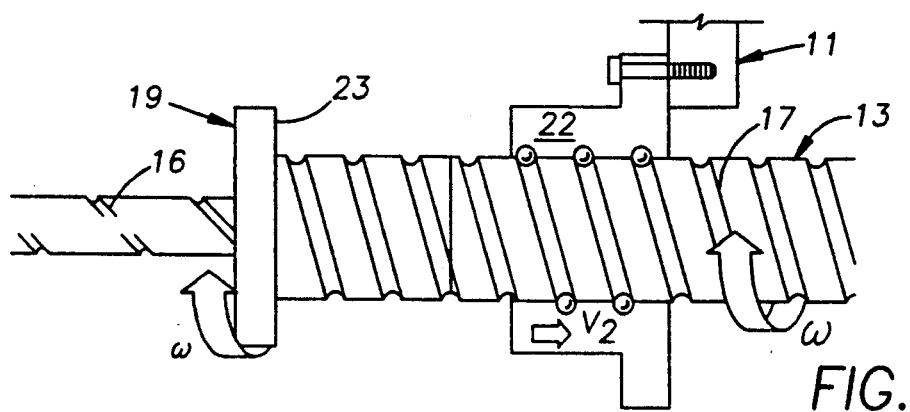

Continuing the sequence, FIG. 1d depicts the second nut 22 traveling solely on the second thread 17.

In summary, the slide 11 thus undergoes rightward motion in series; in accordance with the first lead, then in accordance with the second lead.

With the elements in the position shown in FIG. 1d, and the rotary motion of the lead screw 13 reversed, the sequence is simply reversed.

Rotating the feed screw 13 counterclockwise (when viewed from the right end) will cause the second nut 22 to feed to the left. After feeding onto the rotating first nut 19 and contacting the flange face 23, the first nut 19 can no longer rotate and will move leftward along the first thread 16 while carrying the second nut 22 and slide 11.

The screw shoulder 18 functions as a first engageable stop means for limiting rightward travel of the first nut 19 relative to the feed screw 13, preventing relative rotation between the first nut 19 and feed screw 13.

The flange face 23 functions as a second engageable stop means for limiting leftward travel of the second nut 22 relative to the first nut 19, preventing relative rotation between the second nut 22 and first nut 19.

Figure 2:
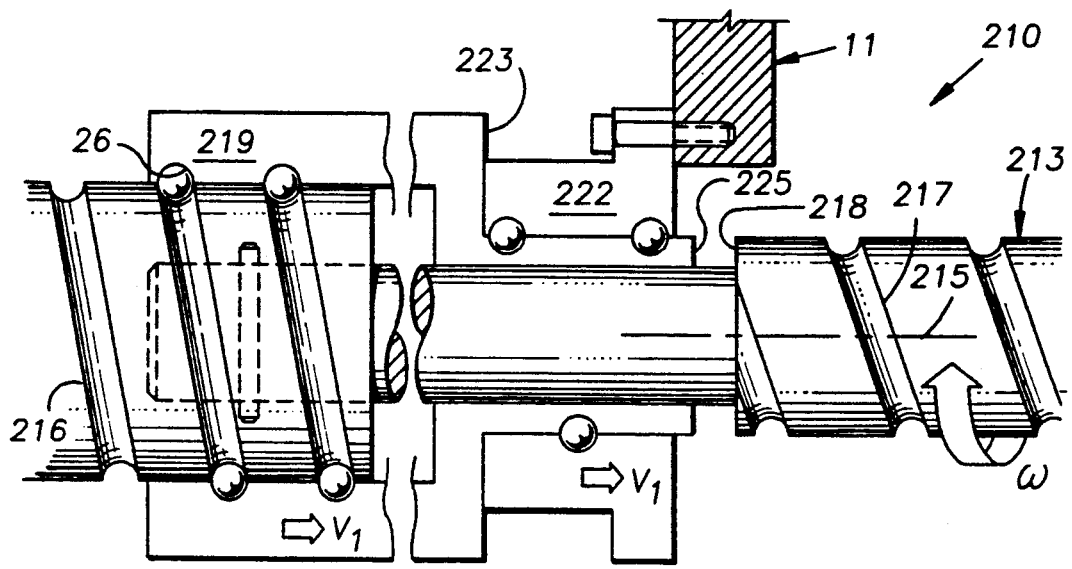
FIG. 2 is a sectional view of an alternative embodiment illustrating changed thread diameters on the feed screw.

FIG. 2 depicts an alternative embodiment of the invention where a feed system 210 operates as the assembly of FIG. 1a, with like parts designated by adding the prefix "2" to the reference numbers. In this design, the second thread 217 has an outer diameter much smaller than that of the first thread 216. The second nut 222 is axially spaced away from the internal helical thread 26 of the first nut 219, i.e. the first and second nuts 219,222 are co-axial but not substantially co-extensive with one another. Again, while ballscrew threads are shown, other thread forms may be employed.

Without showing a modification to the assembly of FIG. 2, it will also readily be appreciated that the first and second threads 216,217 may be of the same pitch diameter or outside diameter, with the difference being in the lead.

Figure 3:
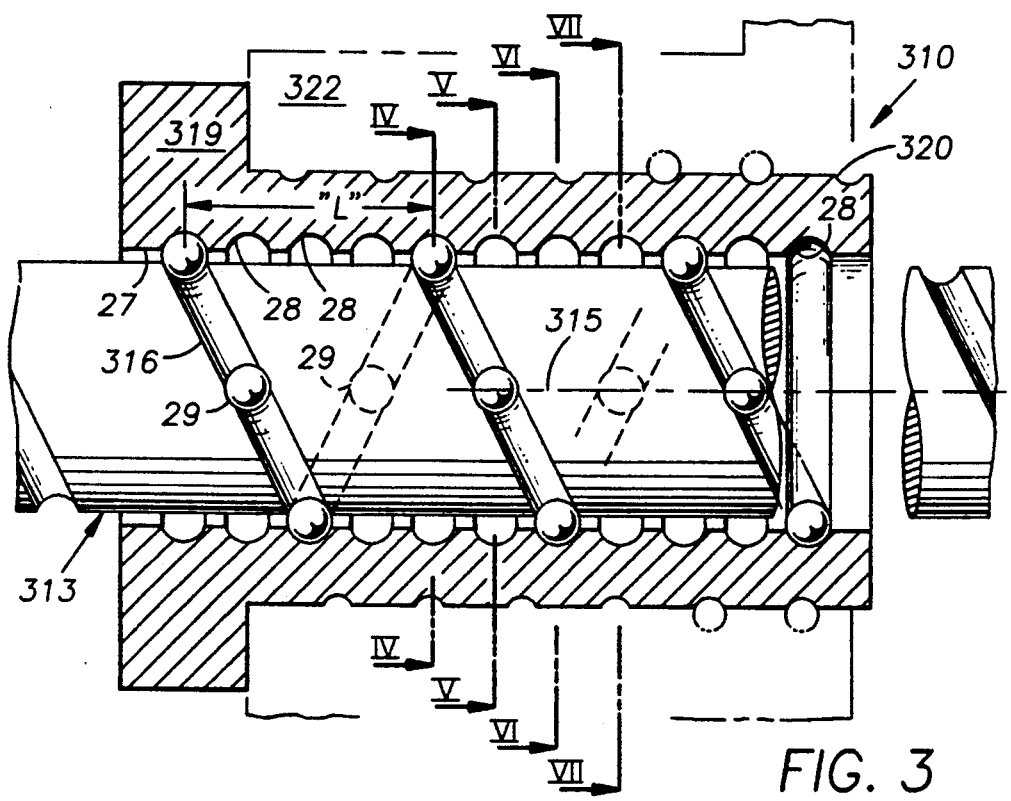
FIG. 3 is a sectional view of an alternative embodiment illustrating a nut having non-helical grooves.
Figure 4:
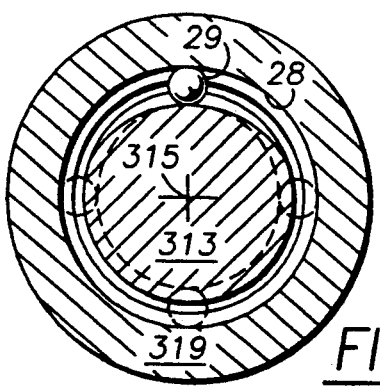
FIG. 4 is a cross-sectional view taken along the line IV—IV of FIG. 3.
Figure 5:
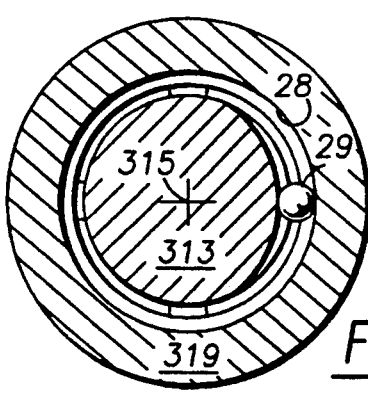
FIG. 5 is a cross-sectional view taken along the line V—V of FIG. 3.
Figure 7:
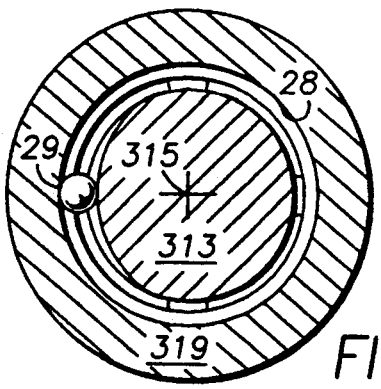
FIG. 7 is a cross-sectional view taken along the line VII—VII of FIG. 3.
Figure 6:
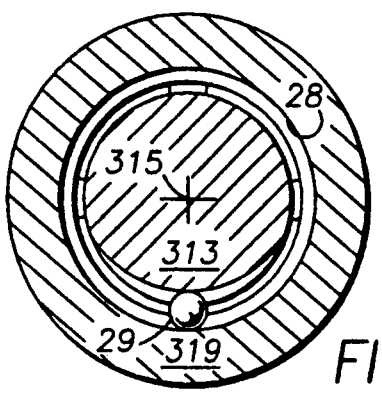
FIG. 6 is a cross-sectional view taken along the line VI—VI of FIG. 3.

FIG. 3 depicts another version of the invention, feed system 310, with parts similar to those of FIG. 1a designated by adding the prefix "3" to the reference numerals. Here, the first nut 319 is shown carrying the second nut 322 on some convenient third thread 320.

The first thread 316 of the feed screw 313 is a single ballscrew thread of lead "L". The bore 27 of the first nut 319 does not have a helical groove. Instead, it has a plurality of axially spaced annular ball grooves 28 which are concentric with the feed screw 313. The spacing of the grooves 28 is optional, but there is to be one ball 29 in each groove 28 for each thread of the feed screw 313, the ball 29 being the constant engagement means between the first nut 319 and feed screw 313. A two-start thread would require two balls 29 per groove 28, etc. The minimum spacing between the grooves 28 is, for the most part, governed by the ball size selected, and, for the example of FIG. 3, the ball size permits an axial spacing of L/4. A helical thread advances through one-fourth its lead for each 90° wrap around the screw. Thus, for the right-hand thread depicted, FIGS. 4-7 show four successive grooves 28, each groove 28 having its associated ball 29 at the respective quarter-point around the screw 313. The result is an extremely compact nut system which may find use in many applications. The nut 319 is far simpler than nuts having an internal helical groove. And, while the nut 319 likely will not have a full complement of contiguous balls 29 in the screw thread 316, the concentric annular shape of the grooves 28 permits a longer nut to be manufactured by conventional turning and internal grinding techniques used, for example, to manufacture outer races of multi-row ball bearings.

Figure 8:
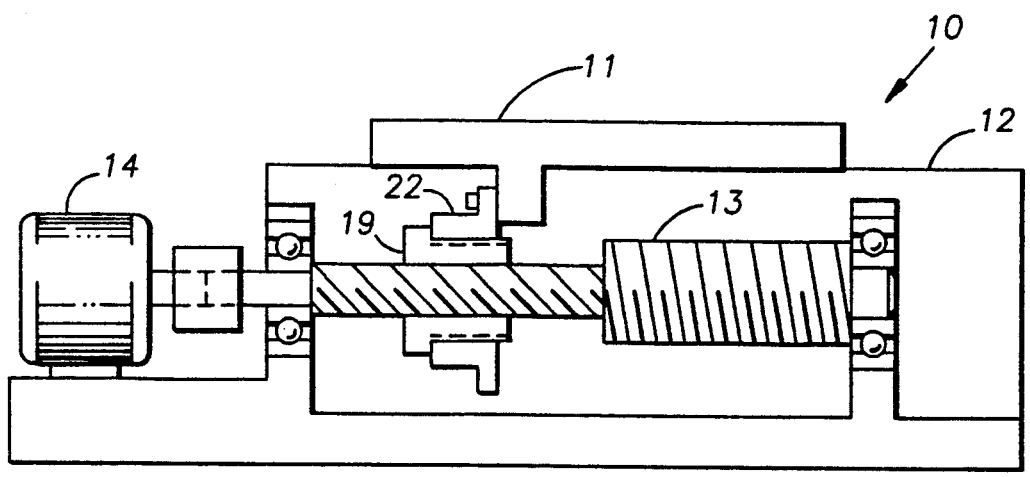

FIG. 8 shows a typical machine structure embodying the feed system 10 of FIG. 1a, where the feed screw 13 is rotatably journalled on the base 12 and the slide 11 is supported on the base 12. The base-supported motor 14 is coupled to the screw 13, the first nut 19 is mounted to the screw 13, and the second nut 22 is secured to the slide 11.

Details of mounting the slide 11 and mounting and driving the feed screw 13 have been omitted throughout, for clarity of illustration, such details being well within the ken of machine designers concerned with this art. And, while a constant angular velocity, $\omega$, was selected for convenience in understanding the operating principles, the rotational speed of the feed screw 13 may be varied, to provide further variations in the motion of the slide 11 relative to the base 12.

While the invention has been shown and described in connection with preferred and alternative embodiments, it is not intended that the invention be so limited. Rather, the invention extends to all designs and modifications as come within the scope of the following claims.

What is claimed is:

1. A feed system for relatively moving a machine member with respect to a reference base, comprising:
   a feed screw mounted to the reference base;
   a first thread portion formed on the feed screw along its longitudinal axis;
   a second thread portion formed on the feed screw along its longitudinal axis, the second and first thread portions being of unequal form;
   a first nut cooperatively engaged with the first thread portion of the feed screw;
   a third thread portion formed on the first nut along its longitudinal axis, the third thread portion being of form substantially equal to the second thread portion;
   a second nut cooperatively engageable with the second and third thread portions, the second nut being mounted to the machine member;
   first engagement means for preventing relative rotation between the first nut and the feed screw;
   second engagement means for preventing relative rotation between the first nut and the second nut; and
   means for relatively rotating one of the second nut and feed screw with respect to the other to thereby relatively move the second nut in reverse directions along the longitudinal axis of the feed screw,
   wherein as the second nut is relatively moved in one direction along the feed screw and the first engagement means is engaged, the second engagement means is disengaged, and
   wherein as the direction of the second nut is reversed and the second engagement means is engaged, the first engagement means is disengaged.

2. The feed system of claim 1, further comprising:
   first ball means for drivingly engaging said first nut with said first thread portion; and
   second ball means for drivingly engaging said second nut with said second and third thread portions.

3. A feed system for relatively moving a machine member with respect to a reference base, comprising:
   a feed screw mounted to the reference base;
   a first helical thread formed on the feed screw along its longitudinal axis;
   a second helical thread formed on the feed screw along its longitudinal axis, adjacent the first helical thread, the first and second threads being of the same hand;
   a first nut coaxial with the feed screw and constantly engaged with the first helical thread;
   a third helical thread formed on the first nut along its longitudinal axis, the third helical thread being of substantially the same hand, lead and pitch diameter as the second helical thread;
   a second nut engageable with the second and third helical threads, the second nut being mounted to the machine member;
   first engageable stop means for preventing relative rotation between the first nut and the feed screw;
   second engageable stop means for preventing relative rotation between the first nut and the second nut; and
   means for relatively rotating the feed screw with respect to the second nut to thereby relatively move the second nut in reverse directions along the longitudinal axis of the feed screw,
   wherein as the second nut is relatively moved in one direction along the feed screw and the first engageable stop means is engaged, the second engageable stop means is disengaged, and the second nut travels off of the second helical thread and onto the third helical thread, and
   wherein as the direction of the second nut is reversed and the second engageable stop means is engaged, the first engageable stop means is disengaged, and the second nut travels off of the second helical thread and onto the third helical thread.

4. The feed system of claim 3, wherein
   said first engageable stop means comprises
      a first stop surface on said first nut, and
      a first mating stop surface on said feed screw; and
   said second engageable stop means comprises
      a second engageable stop surface on said second nut, and
      a second mating surface on said first nut.

5. The feed system of claim 3, further comprising:
   first ball means for drivingly engaging said first nut with said first helical thread; and
   second ball means for drivingly engaging said second nut with said second and third helical threads.

6. The feed system of claim 5, wherein said first ball means comprises:
- a plurality of axially spaced circular ball grooves, within the first nut, said grooves concentric with the longitudinal axis of the feed screw; and
- at least one ball within each groove, cooperating with the first helical thread of the feed screw, wherein relative rotation is converted into relative linear motion between the first nut and the feed screw.

7. The feed screw of claim 5, wherein the lengths of said first and second nuts are such that, after the second nut travels onto the third helical thread, the first and second nuts are substantially coextensive with one another.

* * * * *